United States Patent [19]

Lehmann

[11] 3,976,324

[45] Aug. 24, 1976

[54] MOTOR VEHICLE WITH FOLDABLE TOP

[75] Inventor: Adolf Lehmann, Schonaich, Germany

[73] Assignee: Daimler-Benz Aktiengesellschaft, Germany

[22] Filed: May 30, 1974

[21] Appl. No.: 474,866

[30] Foreign Application Priority Data
May 30, 1973 Germany............................ 2327485

[52] U.S. Cl. .............................................. 296/107
[51] Int. Cl.². ........................................... B60J 7/00
[58] Field of Search ............ 296/107, 116, 118, 119

[56] References Cited
UNITED STATES PATENTS
2,893,782  7/1959  Pollock ............................... 296/107
FOREIGN PATENTS OR APPLICATIONS
155,177  10/1952  Australia ............................. 296/107
160,204  11/1953  Australia ............................. 296/107

Primary Examiner—Robert J. Spar
Assistant Examiner—Donald W. Underwood
Attorney, Agent, or Firm—Craig & Antonelli

[57] ABSTRACT

A foldable top for a motor vehicle, especially for a passenger motor vehicle, which includes windows of elastic material within the transition area of the rear, downwardly sloping roof surface; the windows which are bordered, extend arcuately shaped toward the side surfaces; the lower border of the windows is provided with at least one reinforcement that leads when folding together the foldable top, to a fold configuration which remains always the same and lies outside of the reinforcement.

7 Claims, 3 Drawing Figures

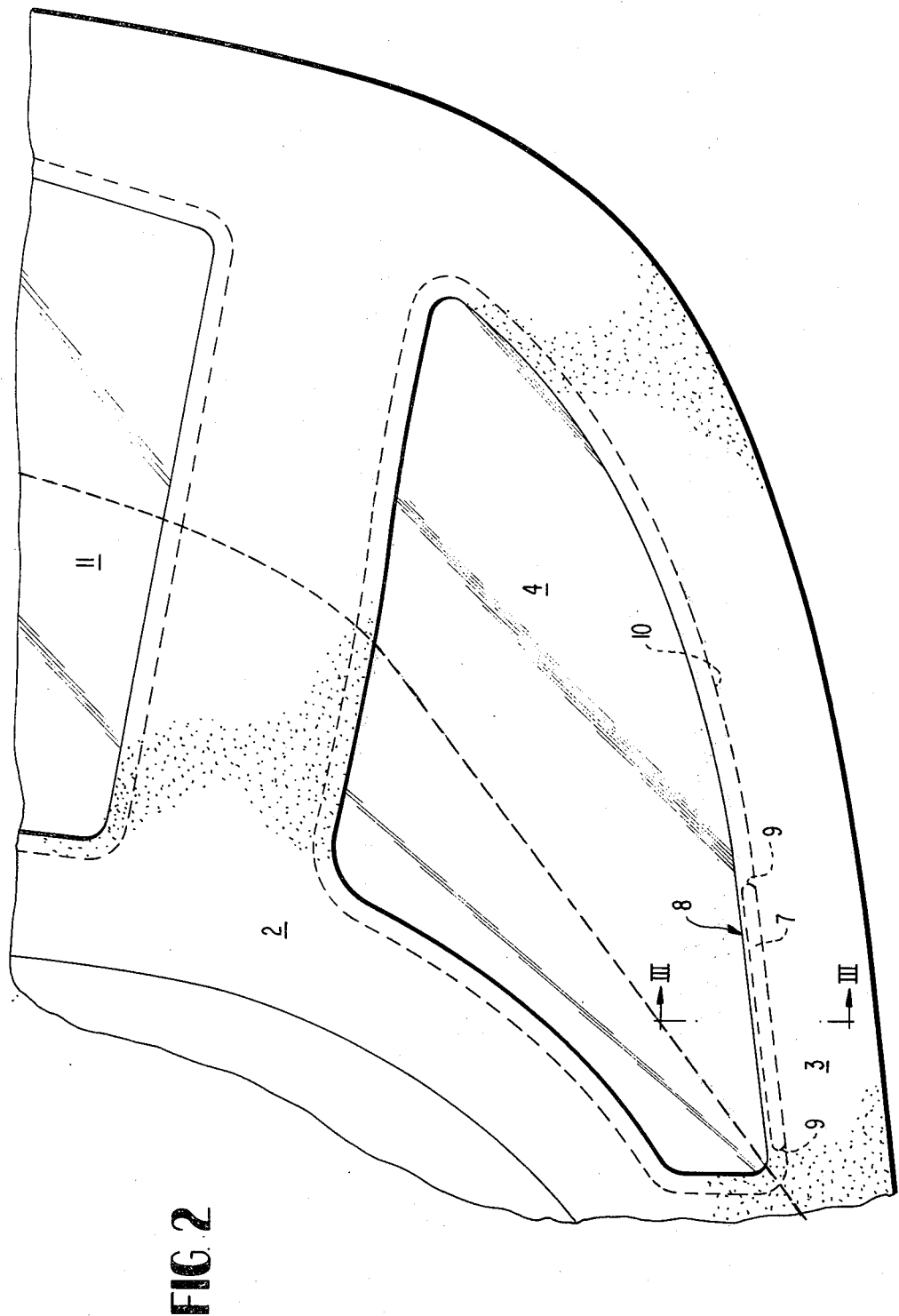

MOTOR VEHICLE WITH FOLDABLE TOP

The present invention relates to a motor vehicle, especially to a passenger motor vehicle with a foldable top, which within the transition area of the rear, downwardly sloping roof surface includes bound or bordered through-vision windows of elastic material which extend arcuately shaped toward the side surfaces.

It is difficult with such tops to so fold the windowpanes which are drawn laterally about the rear corners of the top that the windowpanes do not break or lose their clearness also in case of a repeated opening and closing of the top. In order to avoid these difficulties, it has already been proposed to construct the side windowpanes so as to be removable by unbuttoning the same. This, however, in addition to an increased work during the opening and closing of the top, also entails sealing problems.

Starting with this state of recognition, it is the aim of the present invention to provide in connection with foldable tops having bordered or bound clear-vision windowpanes that are laterally drawn about the rear corners of the roof, to bring these windowpanes in a simple manner during the closing of the roof into an advantageous, accurately predetermined folded position which precludes the danger of a premature breakage or blinding of the windowpane.

Accordingly, it is proposed in a motor vehicle, especially in a passenger motor vehicle having a foldable top which includes within the transition area of the rear, downwardly sloping roof surface, bordered through-vision windowpanes extending arcuately shaped toward the side surfaces and made of elastic material, to provide according to the present invention the lower border of the windowpane with at least one reinforcement which during the folding-together of the foldable top, leads to a fold configuration which remains always the same and lies outside of the reinforcement.

In one preferred embodiment according to the present invention, the reinforcement is constructed as spring steel strip of slight thickness and is arranged as insert below the top cover overlapping the side edges of the clear-vision windowpanes.

In order to avoid damages to the top cover, the end sections of the spring steel strips may be rounded off.

Accordingly, it is an object of the present invention to provide a motor vehicle, especially a passenger motor vehicle with a foldable top, which avoids by simple means the aforementioned shortcomings and drawbacks encountered in the prior art.

Another object of the present invention resides in a foldable top for motor vehicles, in which the side windows provided within the rear corner areas of the foldable top are protected against premature breakage or loss of through-vision.

A further object of the present invention resides in a foldable top for passenger motor vehicles provided with clear windows within the transition areas of the rear corners of the roof, which does not entail any problems as regards sealing, yet permit an easy folding of the roof without complicated manipulations.

A still further object of the present invention resides in a foldable top equipped with windows within the rear corner areas, which assures an accurately predetermined fold position of the top, each time the top is folded together.

These and further objects, features and advantages of the present invention will become more apparent from the following description when taken in connection with the accompanying drawing which shows, for purposes of illustration only, one embodiment in accordance with the present invention, and wherein:

FIG. 2 is a partial plan view, on an enlarged scale, illustrating the transition area of the rear, downwardly sloping roof surface toward the side surfaces.

Figure 1:
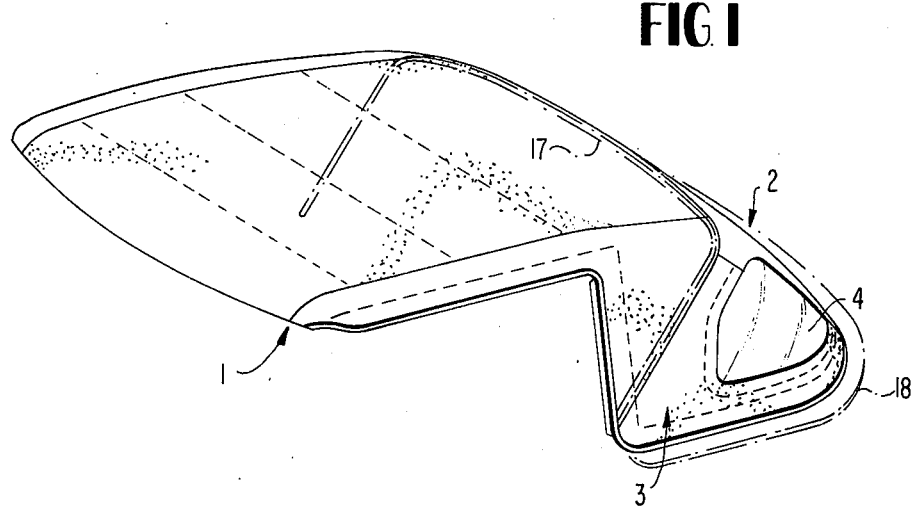
FIG. 1 is a perspective view of a foldable top for a passenger motor vehicle in accordance with the present invention equipped with through-vision windows laterally drawn about the rear corners of the top, and illustrating the roof in the unfolded condition.
Figure 3:
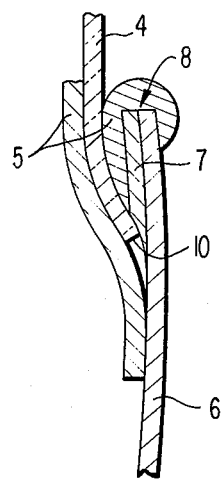
FIG. 3 is a partial cross-sectional view taken along line III—III of FIG. 2.

Referring now to the drawing wherein like reference numerals are used throughout the various views to designate like parts, the foldable top generally designated by reference numeral 1 of a passenger motor vehicle (not shown) is provided within the transition area of the rear, downwardly sloping roof surface generally designated by reference numeral 2 to the side surface generally designated by reference numeral 3 with one through-vision window 4 each of elastic material which extends arcuately shaped. The windowpane 4 is securely anchored in the top cover or fabric 6 by a border or binding 5 (FIG. 3) of any conventional type.

A reinforcement generally designated by reference numeral 8 which is constructed as spring steel strip 7 of slight thickness and which has rounded-off end sections 9 (FIG. 2) is received by the lower border 5 and is covered off by the top fabric 6 overlapping the side edges 10 of the windowpane 4.

The top 1 is normally fixedly connected with a corner support the position of which is schematically indicated by reference numeral 17, and with a curved fabric-retaining member 18 which constitutes the rear termination of the top 1 as more fully disclosed in my copending application Ser. No. 474,813, filed on even date herewith and corresponding to the German Application P 23 27 487.5. The top 1 may be raised and lowered in any conventional manner, for example, by a control linkage as disclosed in my copending application Ser. No. 474,811, filed on even date herewith and corresponding to German Application P 23 27 486.4.

If the fabric-retaining member 18 is pivoted up, then a fold position will necessarily result which extends in the vehicle transverse direction approximately in the middle between retaining member 18 and the corner support 17, and which then continues in each case approximately in the direction of the laterally arranged top support bracket (not shown). The fold configuration is thereby determined primarily by the construction of the ends of the retaining member 18. The connection of the lateral fold ends with the fold position extending in the vehicle transverse direction has to pass necessarily by way of the windows 4 drawn laterally about the rear top corners; however, this connecting line could change during each folding operation, which would lead to the result that the window 4 breaks or becomes opaque already after a relatively short period of time. The reinforcements 8 according to this invention, on the other hand, ensure an accurately definable fold configuration within the critical area.

Thus, if the top 1 is folded together in a manner not illustrated, then a fold configuration will necessarily result--conditioned by the reinforcement 8--as is indicated in dash and dot lines in FIG. 2. This fold configuration continues over a rear window 11, extending approximately in the vehicle transverse direction and terminates at the outer edge of the foldable top 1, mirror-image-like by way of the through-vision window 4, extending over the oppositely disposed window. Owing to the fold configuration which forms always in the same direction and location during each folding operation, the foldable top 1 can be accommodated within the smallest space without the danger that the windows 1 will break or become blind prematurely.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A foldable top for a vehicle comprising a foldable roof covering having a rear downwardly sloping surface with laterally extending side surfaces; at least one flexible window means secured in said rear surface, said window means including at least one side portion extending in said side surfaces; retaining means fixed to the rear termination of said roof covering for supporting said rear termination; and reinforcement means disposed at said at least one side portion for reinforcing the area of said at least one side portion such that a predetermined fold configuration is provided at least at said side surfaces upon folding said roof covering, thereby preventing damage to said at least one side portion, wherein said at least one portion of said window means includes two side windows disposed respectively at said surfaces, and wherein said reinforcement means are secured along at least a portion of a lower edge of each of said two side windows.

2. A foldable top according to claim 1, wherein said reinforcement means are elongated strips having a slight thickness, and wherein said strips are arranged as inserts within an attachment of said lower edges of each of said two side windows to said side surfaces.

3. A foldable top according to claim 2, wherein said elongated strips are spring steel.

4. A foldable top according to claim 3, wherein said elongated strips include rounded off edges.

5. A foldable top for a vehicle comprising a foldable roof covering having a rear downwardly sloping surface with laterally extending side surfaces; at least one flexible window means secured in said rear surface, said window means including at least one side portion extending in said side surfaces; retaining means fixed to the rear termination of said roof covering for supporting said rear termination; and reinforcement means disposed at said at least one side portion for reinforcing the area of said at least one side portion such that a predetermined fold configuration is provided at least at said side surfaces upon folding said roof covering, thereby preventing damage to said at least one side portion, wherein said reinforcement means are elongated strips having a slight thickness, and wherein said strips are arranged as inserts within an attachment of a lower edge of said at least one side portion to said side surfaces.

6. A foldable top according to claim 5, wherein said elongated strips are spring steel.

7. A foldable top according to claim 5, wherein said elongated strips include rounded off edges.

* * * * *